INVENTORS,
THOMAS S. TAYLOR
FREDERICK R. LING
BY
ATTORNEYS

June 4, 1968  T. S. TAYLOR ET AL  3,386,533
BOLSTER-MOUNTED BRAKE

Filed Oct. 22, 1965  3 Sheets-Sheet 2

INVENTORS.
THOMAS S. TAYLOR
FREDERICK R. LING
BY
Wallace Kinzer and Dorn
ATTORNEYS June 4, 1968  T. S. TAYLOR ET AL  3,386,533
BOLSTER-MOUNTED BRAKE
Filed Oct. 22, 1965  3 Sheets-Sheet 3
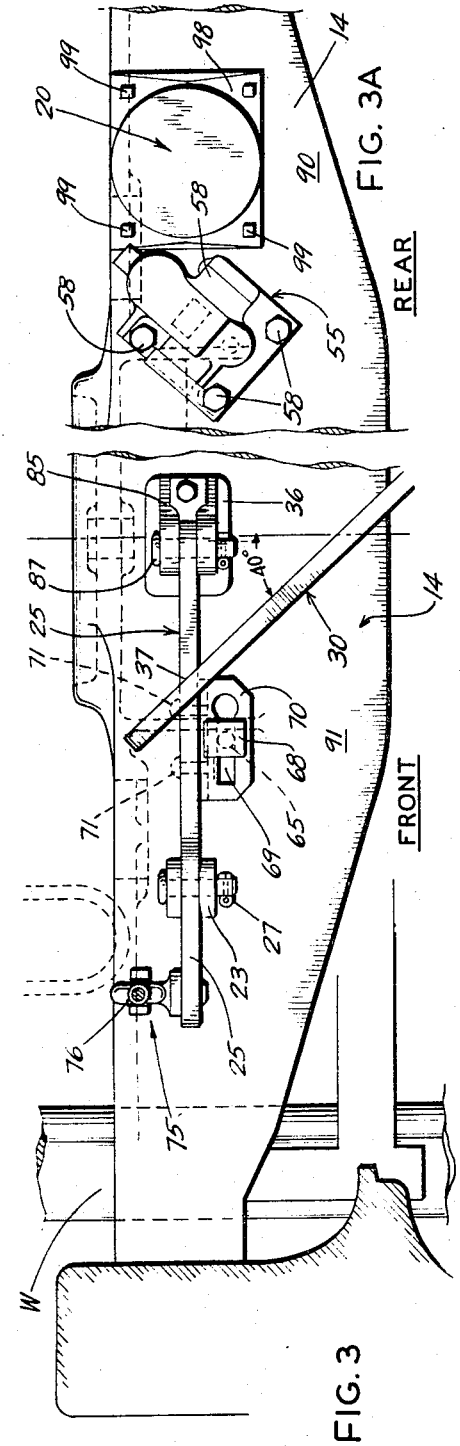
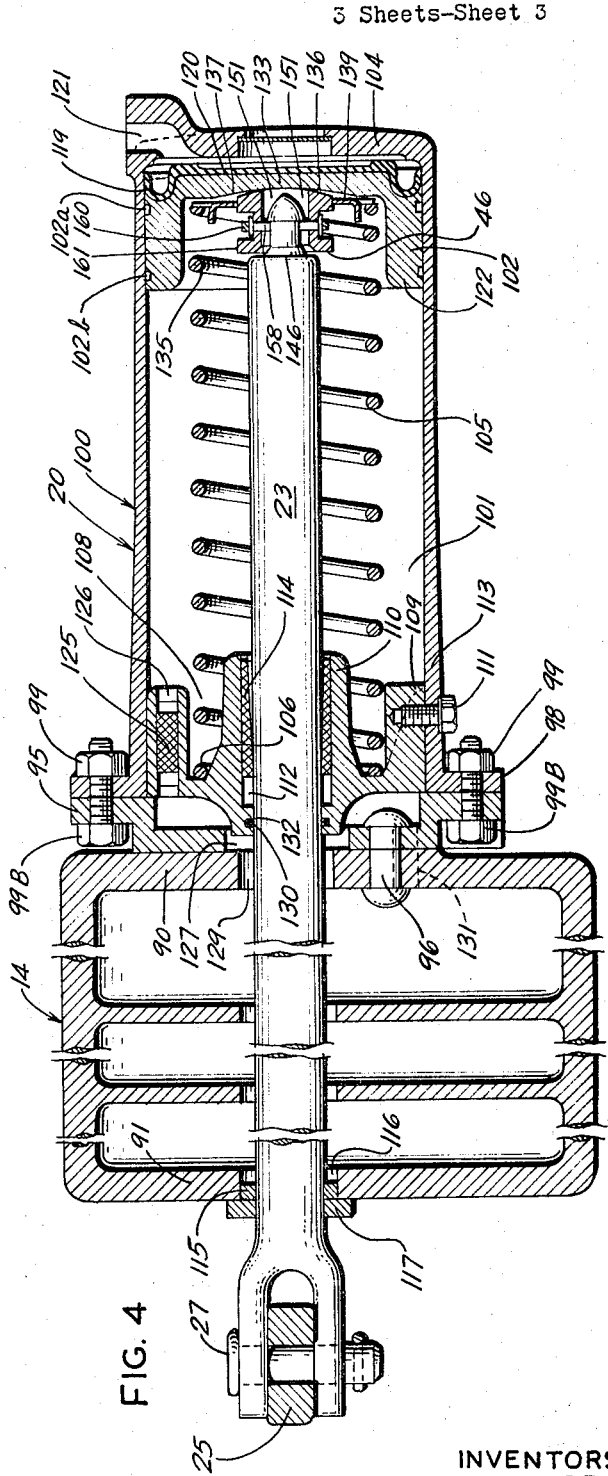
INVENTORS.
THOMAS S. TAYLOR
FREDERICK R. LING
BY *Wallace Hinze and Dorn*
ATTORNEYS

United States Patent Office 3,386,533
Patented June 4, 1968

3,386,533
BOLSTER-MOUNTED BRAKE
Thomas S. Taylor, Suffern, N.Y., and Frederick R. Ling, New Milford, N.J., assignors to Abex Corporation, a corporation of Delaware
Filed Oct. 22, 1965, Ser. No. 501,538
5 Claims. (Cl. 188—52)

ABSTRACT OF THE DISCLOSURE

A bolster-mounted brake unit for a railroad car is afforded of such form as to cooperate with items of standard equipment such as live and dead levers and the so-called rod-under linkage. Various parts of the brake unit are constructed to enable cooperation to be achieved so that there can be easy conversion from the standard car-mounted brake to a brake unit of the present invention which can be easily adapted to cars of different tonnage.

---

This invention relates to brake units for railroad cars and more particularly to brake units mounted on a truck of a railroad car.

A truck mounted brake unit, as the term is employed hereinafter, refers to a brake unit having a brake beam actuating cylinder disposed on the truck of the railroad car for actuating the brake beams; whereas a car mounted brake system of the conventional kind has an actuating cylinder mounted on the car body and a series of levers and linkage connections extending from the car body to the truck for operation of the brake beams.

With the advent of longer and lower specialized freight cars, particularly cars having deep center portions, the conventional brake linkage or riggings from a cylinder on the car body to the brake beams on the trucks have become more complex and have limited the freedom of design of the specialized car body. As can be appreciated, the design of special linkages and levers for each kind of special car body to afford connections from an actuating cylinder on the car body to the brake beams on the trucks adds considerably to the cost of such brake systems. The present invention is directed to truck mounted brake systems eliminating the necessity for such custom made linkages and levers and is also directed to improvements in a truck mounted brake system wherein the beam actuating cylinder is movable with the compression and expansion of the truck springs, upon changes in loading in the railroad car, to permit a change in the amount of braking force between an empty load and a full load condition of the raliroad car. Accordingly, an object of the present invention is a unique truck mounted braking system having the aforesaid capabilities of varying the amount of braking force with changes in load.

A known type of brake unit employs brake beams of the truss type and a conventional bottom rod connecting the live and dead truck levers of the respective brake beams. The brake beams, however, of this known type of brake unit have a special beam strut of 55° angle. Accordingly, another object of the present invention is to employ standard shapes of brake beams and standard angles of inclination of brake beam struts in a truck mounted brake while affording changes in braking force with changes in car loading. The use of the standardized elements such as brake beams, live lever, dead levers and rod-under linkage affords a brake unit having time tested and safety-proven braking components. Moreover, the inventory problems caused by use of specialized live levers is eliminated and the conversion of existing equipment by a truck mounted cylinder and force operating lever is thereby facilitated.

A further object of the present invention is the use of most of the same components for one or more weight categories of railroad cars and a repositioning of a bracket connection to the bolster to change lever ratios and consequently a change in the brake shoe load, afforded by a brake unit. More specifically, and as a further object of the invention, identical force multiplying lever, cylinder assembly, bracket and slack adjuster are used for two different weight classifications and the bracket is reoriented to move a fulcrum point causing a change in lever ratios.

Preferably, a truck mounted brake unit is readily adapted to be installed in the field on truck bolster without the requirements of expensive equipment and time-consuming specialized operations for the installation of the cylinder, slack adjuster, operating levers and other equipment. In this connection and as a further object of the invention, a novel arrangement of the actuating cylinder and slack adjuster facilitates installation while not interfering with the desired space requirements for the car body between the trucks.

A further object of the invention is a novel push rod and cylinder relationship enhancing repair and installation of the cylinder and an internal piston. More specifically, an object of the invention is the capability of automatic connection and disconnection of an actuating push rod, sub-assembly relative to a piston in the operating cylinder for the purpose of facilitating installation on a bolster and serving of the cylinder and piston. A feature of the invention is the automatic connection of the push rod to a return spring and positioning of the push rod in operative relationship to a free floating piston, the piston being free floating in the sense of being non-positively connected to the push rod.

The present invention employs a relatively long push rod and a long piston stroke and provides the appropriate amount of movement of the brake beams and proper shoe clearance with brakes retracted. A feature of the invention is a novel free floating piston and a non-positive interconnection between the free floating piston and the push rod. A further feature of the present invention is a novel push rod and cylinder assembly on the bolster of a railroad car wherein the push rod is supported by bushings on the bolster and bushings within the operating cylinder for the push rod.

The usual bolster of the truck is cored with a generally hollow interior, which is thus protected somewhat from ambient moisture conditions and from foreign matter. Under another object of the present invention, a non-pressure side of the actuating cylinder has an air inlet connected to this hollow cored portion of the bolster. A further object of the invention is to filter airborne, foreign matter from entrance into the non-pressure side of the cylinder.

A feature of the present invention is the separate mounting of an automatic slack adjuster and the brake beam actuating cylinder adjacent to one another while having the axis of the cylinder slightly canted relative to the axis of the slack adjuster.

Other and further objects of the present invention will be apparent from the following description and claims and are illustrated in the accompanying drawings which, by way of illustration, shows preferred embodiments of the present invention and the principles thereof and what is now considered to be the best mode contemplated for applying these principles. Other embodiments of the invention embodying the same or equivalent principles may be used and structural changes may be made as desired by those skilled in the art without departing from the present invention and the purview of the appended claims.

3

In the drawings:

FIG. 3 is a front elevational view of a portion of the brake unit of FIG. 2;

FIG. 3a is a rear elevational view of the cylinder and slack adjuster rotated through 180° relative to FIG. 3;

FIG. 4 is an enlarged sectional view of a brake cylinder and a push rod assembly employed in the preferred embodiment of the invention;

Figure 1:
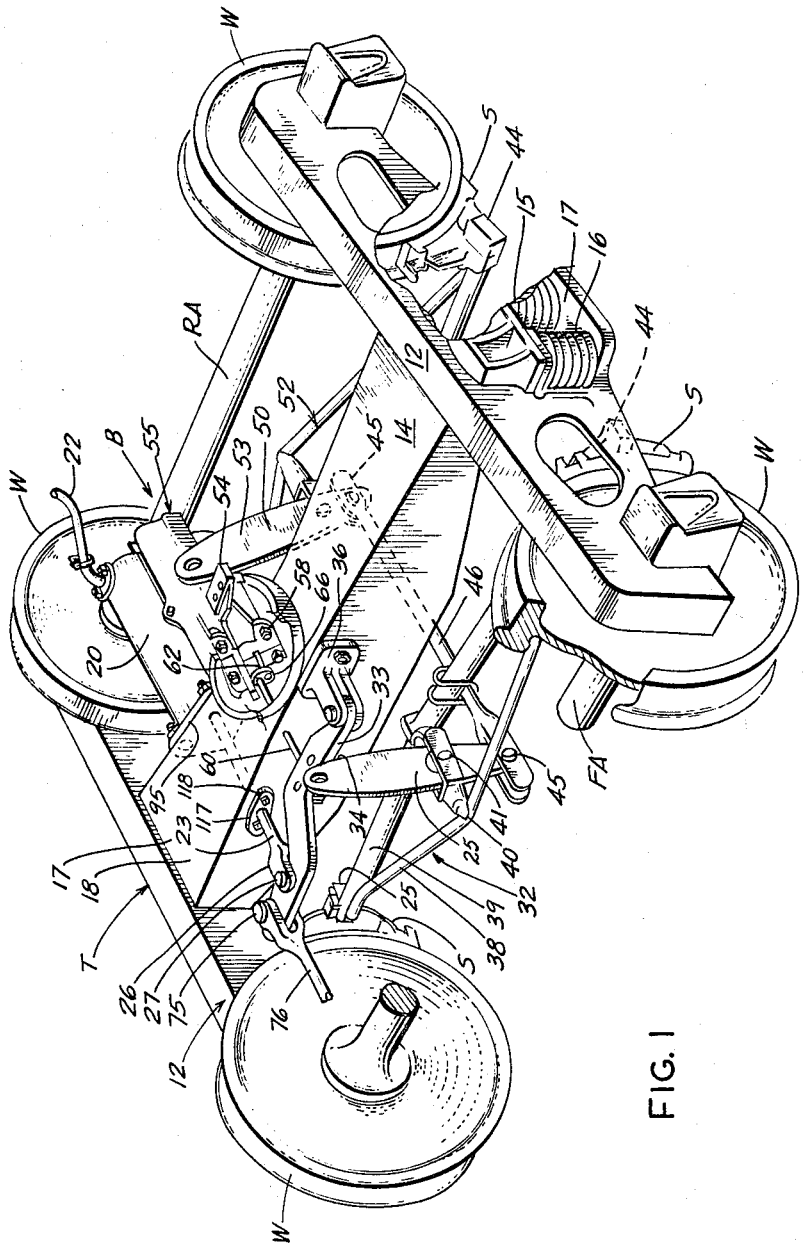
FIG. 1 is a perspective view of a truck mounted brake unit constructed in accordance with the preferred embodiment of the invention.

Referring now to the drawings and more particularly to FIG. 1, there is illustrated a conventional truck T for supporting a railroad car equipped with a brake unit B, which brake unit B is constructed in accordance with the preferred embodiment of the present invention. The truck T has a pair of spaced elongated side frame members 12 in which are journaled a front axle FA and a rear axle RA to which are secured car wheels W. A bolster 14 spans the side frame 12 of the truck T midway between the side frames 12 and has pads 15 on the ends of the bolster 14. The pads 15 extend outboard of the side frames 12 and rest on coil springs 16 supported on supports 17 of the side frames 12. The bolster 14, and the car body resting thereon, are thus spring supported by the springs 16 on the side frames 12. With changes in car weight, for example when a railroad car is being loaded or unloaded, the bolster 14 moves vertically relative to the stationary side frames 12 with the compression or expansion of the springs 16.

The present invention is directed to truck mounted brake units, as contrasted with car mounted brake units, wherein a cylinder is secured to the underside of the railroad car body and has a rigging or linkage system from the car body to the brake beams on the trucks T. With the present trend towards longer and heavier cars for carrying special types of loads and particularly those cars having deep center or sill portions, considerable difficulty and expense is encountered in affording linkages between a brake operating cylinder on the car body and the brake beams mounted on the truck.

The brake unit B affords increased flexibility in car design in eliminating the aforementioned linkage from the car body. In the brake unit B, a fluid operating cylinder 20, FIG. 1, is secured to a rearward vertical wall on the bolster 14 and is disposed beneath the plane of the upper surface 18 of the bolster 14. As best seen in FIG. 1, an air pressure line 22 is in fluid communication with the cylinder 20 which has a push rod 23 extendible from the cylinder 20 and through the bolster 14 to pivot a force multiplying lever 25 in a counterclockwise direction, as seen in FIG. 1. The push rod 23 extends through the bolster 14 and has a clevis connection 26 to the outer end portion of the force multiplying lever 25. The clevis connection 26 includes a pin 27 extending through an elongated slot 28, FIG. 2, in the force multiplying lever 25. The lever 25 is pivotally mounted on a supporting means or bracket 36 on the bolster 14.

The force multiplying lever 25 is disposed in a generally horizontal plane and functions to actuate a live lever 30 of a first brake beam 32 which in turn actuates a bottom rod 46 to move a dead lever 50 of a second brake beam 52. The lever 25 has a forward, narrow side wall 33 juxtaposed for sliding engagement and contact with an adjacent side wall 34 of the live lever 30. The live lever 30 is disposed at the conventional angle to the horizontal as specified by the Association of American Railroads.

Since the force multiplying lever 25 is secured by the bracket 36 to the bolster 14, the lever 25 moves vertically with the bolster 14 with changes in car loading. The maximum amount of vertical movement of the bolster is usually limited by the geometry of suspension springs 16.

The live lever 30 is disposed at an angle of approximately 40° to the vertical, as best seen in FIG. 3. Consequently, as the horizontal lever 25 moves vertically with the bolster 14 an intersection or contact point 37 between the horizontal lever 25 and the live lever 30 changes both vertically and horizontally. The changes in position of the contact point 37 between the live lever 30 and the force multiplying lever 25 cause changes in the moment and thereby the amount of braking force being applied by the brake beams 32 and 52, as will be explained hereinafter in detail.

The force applied to the live lever 30 causes pivotal movement of the live lever 30 on its live lever beam 32. The live and dead lever beams 32 and 52 are conventional truss type brake beams having a conventional strut 40, tension member 38 and compression member 39. The live lever 30 is pivotally mounted on pivot pin 41 disposed on the strut 40 between the tension and compression members 38 and 39 of the live lever beam 32.

The lower end of the live lever 30 is connected by a pin 45 to a bifurcated end of the conventional bottom-under rod 46 which extends beneath the bolster 14 and is connected at its rearward end by a similar pin 45 to the dead lever 50. The dead lever 50 is mounted on the dead lever brake beam 52 of similar construction to the truss type brake beam 32 hereinbefore described in detail. The same reference characters have been applied to the similar elements of the live lever and dead lever brake beams 32 and 52.

The upper end of the dead lever 50 has a portion 53 in engagement with a lug 54 of an automatic slack adjuster 55. The function of the automatic slack adjuster is to assure uniform piston stroke of the piston within the cylinder 20. The slack adjuster 55 is preferably "double acting" in that its adjuster lug 54 is adapted to move in the forward and rearward directions "to pay out" or "to take up" slack in the brake linkage. The slack adjuster 55 functions to sense movement of the horizontal lever 25 and the piston travel within the cylinder as well as the force being applied by the horizontal lever to assure that the proper brake cylinder pressure is obtained through proper piston travel. Thus, the slack adjuster 55 controls the stroke of the piston and air volume in the cylinder 20 and thus permits a range of brake shoe thicknesses due to wear or a change in brake shoes.

Figure 2:
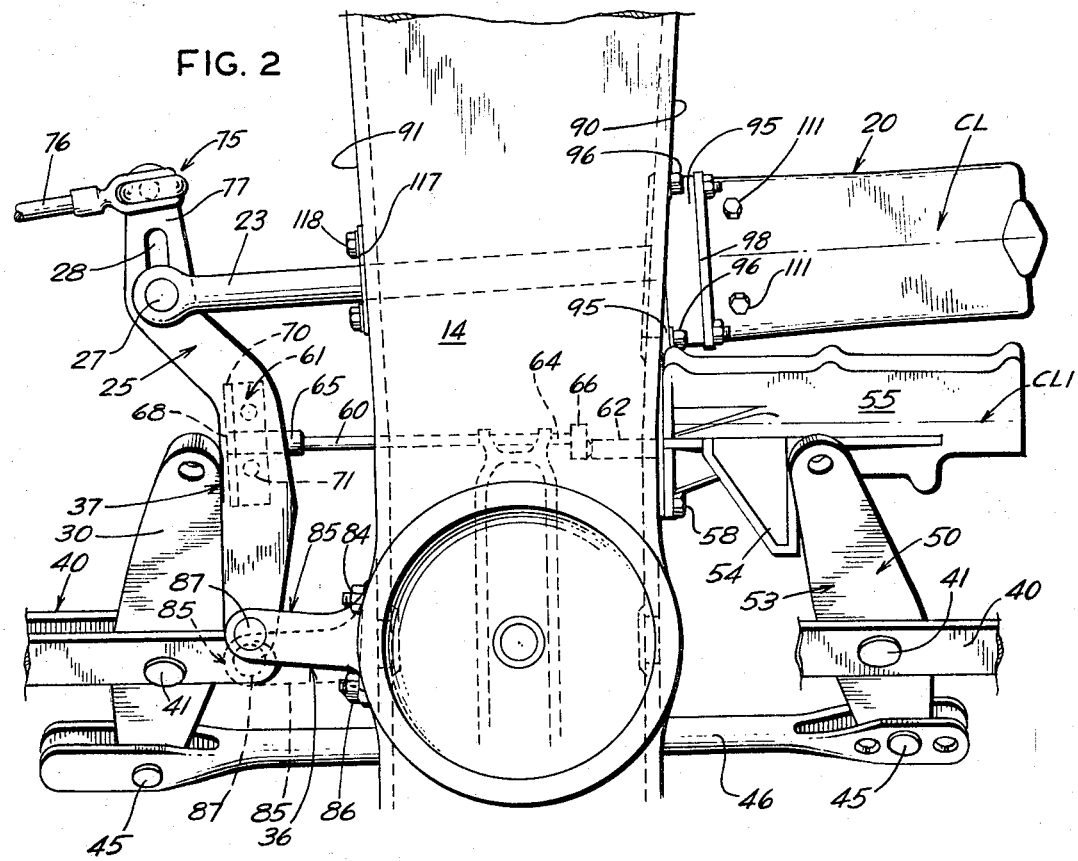
FIG. 2 is a partial plan view of the truck and brake unit of FIG. 1.
Figure 6:
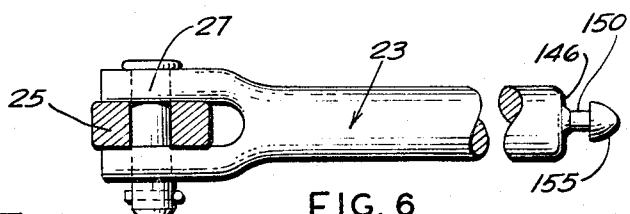
FIG. 6 is a view of the push rod.

The slack adjuster 55 is suitably secured to the bolster 14 adjacent the cylinder 20 on the bolster 14 by fasteners 58, as best seen in FIG. 2.

The cylinder 20 and slack adjuster 55 are arranged to afford freedom of design for special cars having deep centered sill portions, and to afford a balancing of the forces being exerted on the bolster during a braking operation. To this end, it is preferred to have the cylinder 20 and slack adjuster 55 positioned closely adjacent each other and to have the center line CL, FIG. 2, of the cylinder 20 inclined at an angle to a center line CL1 of the slack adjuster 55. This inclination of the cylinder 20 affords spacing between the slack adjuster 55 and the cylinder 20 sufficient to permit an operator to have access to the bolts for the cylinder 20 as well as the slack adjuster 55.

The canting of the cylinder means 20 and the push rod 23 relative to the bolster 14, FIG. 2, affords the advantage of having the push rod 23 apply the operating force to the horizontal lever 25 at a more nearly tangential line to the arc through which the horizontal lever 25 pivots about the bracket 36. This tangential application of the force by the push rod 23 and pin 27 to the horizontal lever 25 minimizes the amount of sliding movement of the pin 27 in the slot 28 during the pivoting of the horizontal lever 25. Since the amount of sliding movement of the pin 27 is decreased, the length of the slot 28 is reduced.

The canting of push rod 23 permits the length of the horizontal lever 25 to be reduced. This reduction in length of the slot 28 and the length of the horizontal lever 25 is of particular advantage in affording one size of horizontal lever 25 for different weight classifications of cars which require generation of different braking forces as will be explained in greater detail hereinafter.

The placing of the slack adjuster 55 near the cylinder 20 and the positioning of the bracket 36 at the center of the bolster 14 provides a substantially balanced force arrangement on the bolster thereby preventing the twisting of the bolster 14 relative to the side frames 12 during a braking operation. That is, the forces being exerted on the bolster 14 during a braking operation are substantially balanced and are applied to the bolster at three locations, namely at the cylinder 20, slack adjuster 55 and the bracket 36.

The slack adjuster 55 is a conventional double acting slack adjuster of the automatic type which is commercially available. The slack adjuster lug 54 is biased by a spring (not shown) for movement and has a pawl engageable with a rack to limit movement of the lug 54 when the brakes are released. Since the slack adjuster 55 is the reaction point for pivoting of the dead lever 50, the position of lug 54 determines the position of the dead lever brake beam 52.

The slack adjuster 55 senses the amount of movement of the horizontal lever 25 by means of a sensing or actuating rod 60, FIG. 2, extending from a bracket 61 on the underside of the horizontal lever 25 to a rod 62 connected internally within the slack adjuster 55. The rod 60 is threaded at its rearward end 64 into a block 66 secured to the rod 62 of the slack adjuster 55.

The forward end 65 of the sensing rod 60 has a transverse stud or block 68 secured thereto as by welding, FIG. 3. The forward end 65 of the sensing rod 60 extends through an elongated, generally horizontal slot 69, FIG. 3, formed in a depending leg 70 of the bracket 61 which is secured by fasteners 71 to the underside of the horizontal lever 25. As seen in FIG. 3, the block 68 and slot 69 constitute a one-way connection between the sensing rod 60 and the horizontal lever 25. The block 68 has a greater width than the width of the slot 69 to prevent the movement of the block 68 through the slot 69. Counterclockwise movement of horizontal lever 25, as viewed in FIG. 2, beyond the nominal amount accompanying the nominal piston stroke, exerts a pulling force on the rod 60, which in turn, pulls on the rod 62 leading to the slack adjuster 55. However, clockwise movement of the lever 25 has no effect on the sensing rod 60.

For the purpose of adjusting the position of the block 68 relative to engagement with the bracket 61 on the lever 25, the sensing rod 60 is threaded at its end portion 64, FIG. 2, and thus is adapted to be turned in the block 66. Thus, the sensing rod 62 may be adjusted to a predetermined position to detect any additional amount of counterclockwise pivoting, of the horizontal lever 25 with overtravel of the piston in the cylinder 20. The application of the brake shoes against the treads of the wheels W before the piston has traveled through its nominal stroke is detected by the slack adjuster lug 54 which causes a compensatory action by the slack adjuster 55.

Figure 7:
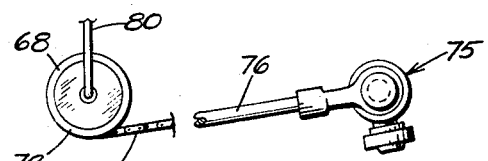
FIG. 7 is a diagrammatic drawing of the hand brake operating linkage.

The present invention is particularly adapted for ease of operation by a hand brake assembly which includes a simple universal pin connection 75, FIG. 2 between an operating rod 76 and the outer free end 77 of the horizontal lever 25. The operating rod 76 is preferably connected to a chain 76A, FIG. 7, which, in turn, is wound about a ten inch sheave wheel 79 which is journaled for rotation about a stud 80 secured to the underside of the car body. Thus, it will be understood that a trainman riding the car body exerts a force through a conventional hand brake power unit on the car body to pull the operating rod 76. Pulling of the operating rod 76 pivots the horizontal lever 25 in the counterclockwise direction against the live lever 30. Pivoting of the live lever 30 moves the rod 46 to actuate the dead lever 50 and resultingly the brake beams 32 and 52 move the four brake shoes S against the respective wheels W. The sensing rod 60 of the automatic slack adjuster 55 senses the amount of movement of the live lever 25; and the slack adjuster 55 also senses the load applied to the dead lever 50 and reacting on the slack adjuster lug 54. Alternatively, the operating rod 76 could be connected by a clevis to the pin 27 of the push rod 23 rather than to the horizontal lever 25. In this alternative connection, a bell crank is secured to the car body rather than a sheave wheel 79 to change the direction of chain motion. The bell crank is connected to the hand brake power unit on the car body.

The hand brake is connected to only a single truck mounted brake unit of the two trucks which are employed to support a railroad car. This is because the output force from the hand brake power unit applied to the rod 76 is about twice the output force capable of being generated by the cylinder 20 and push rod 23. Thus, the hand brake mechanism can generate about the same amount of brake shoe load as generated by pneumatic pressure in both of the cylinders 20 on each of the respective trucks T for the railroad cars.

In the herein illustrated embodiment of the invention, the brake unit is adapted to apply the amount of braking force necessary for brake shoe loads for a car of 263,000 pounds gross rail load. Thus, the truck mounted brake B described herein is useable in the 100 ton equipment classification.

An important aspect of the present invention is the ability to use most of the same components of a truck mounted brake unit B for either a 100 ton or 70 ton car. The 70 ton railroad car has a load capacity of approximately 220,000 pounds gross rail load. Whether the amount of braking force being generated by the cylinder 20, slack adjuster 55 and lever 25 is for the 100 ton or a 70 ton classification, is determined by the orientation of the mounting bracket 36 and consequently the position of the fulcrum pin 87, FIG. 3. More specifically, the position of the fulcrum pin 87 changes with 180° turning of the bracket 36 as the fulcrum pin 87 is carried on bifurcated arms 85 of the bracket 36 which are inclined at an angle from the normal to the base portion 86 of the bracket 36, FIG. 2. When the bracket 36 is in the orientation shown in solid lines in FIG. 2, the bifurcated arms 85 are inclined toward the push rod 23 with the fulcrum pin 87 closer to the push rod 23. However, if the bracket 36 were secured to a bolster with the bifurcated arms 85 inclined away from the push rod 23 (as shown in dotted lines) the fulcrum pin 87 is moved further away from the push rod 23. The dotted and solid line positions of the arms 85 represent the orientation of the bracket 36 on bolsters of trucks for the 70 and 100 tons, respectively. It will be appreciated that the position of the fulcrum point at pin 87 for the lever 25 determines the intersection point between the live lever 30 and the horizontal lever arm 25 and thereby a change in moments applied to live lever 30. The bracket 36 can be mounted at the mid-point of the bolster 14; and the cylinder 20 and slack adjuster 55 are mounted adjacent one another to balance any forces tending to turn the bolster relative to the side frames 12 during an air brake application.

The horizontal lever 25 has an elongated slot 28 for receiving the pin 27. Thus, the pin 27 is adapted to apply an operating force from the push rod 23 while allowing horizontal repositioning of the force multiplying lever 25. The slot 28 also affords sufficient spacing to prevent binding of the pin 27 while the horizontal lever 25 pivots and the push rod 23 reciprocates relative to the bolster 14. Manifestly, considerable advantage is realized in employing much of the same inventory for both 100 and 70 ton equipment. Preferably, the support bracket 36 is appropriately marked to indicate its 100 ton orientation and its 70 ton orientation to assure that the bracket is properly installed for the cars of 100 and 70 tons, respectively. Additionally, the bracket 36 has fastener receiving holes for fasteners 84 offset from each other so that the bracket 36 must be properly oriented when fastened to a 100 or 70 ton bolster. That is, a 100 ton bolster would have its fastener receiving holes arranged to receive the bolts 84 only when the bracket 36 is oriented in its solid line orientation, FIG. 2; and conversely the fastener receiving holes in 70 ton bolster would have its fastener receiving holes aligned with the bolts 84 only when the bracket 36 is oriented in the dotted line position of FIG. 2.

It will be recalled that the bolster 14 is able to move downwardly so that the intersection point between the horizontal lever 25 and the live lever 30 moves rightwardly, as viewed in FIG. 1, closer to the pivot pin 87. As the intersection point between the live lever 30 and force multiplying lever 25 moves closer to the pin 87, the moment about the pin 45 connecting the live lever 30 to the bottom rod 46 is increased thereby affording an increase in braking force applied by the shoes S of each of the brake beams 32 and 52. Conversely, as the sprung bolster moves upwardly the distance between intersection point 37 and the strut center pin 41 along live lever 30 is shortened. This decreases the effective length of lever 30 and decreases the net force at point 41, which force ultimately becomes brake shoe load. However, the net result of the increase due to the movement of point 37 on the horizontal lever 25 and the decrease due to the movement of point 37 on live lever 30 is an increase of about 10 percent. This increase in braking force with loading of the car affords high braking force with the fully loaded railroad car. Conversely, unloading of the car and lifting of the bolster 14 moves the intersection point 37 leftwardly, FIG. 2, decreasing the moment about the pin 45 when the cylinder 20 causes the push rod 23 to pivot the horizontal lever 25 and live lever 30. This reduced amount of braking force for the empty car is termed "empty load compensation." In some instances, cars built of lightweight materials are so light when empty that a special weight compensating apparatus has to be provided for the braking system to reduce the amount of braking force applied to the car wheels when the car is empty. The amount of compensation afforded by changing the lever ratio from a fully loaded car to an empty car is in the order of 10 percent in the herein disclosed embodiment of the invention; and in some instances this is sufficient to eliminate the need for empty load compensation mechanisms.

The bolster 14, illustrated in FIGS. 1 and 2, has a center portion of narrow width and portions of wider width adjacent the side frames 12. A mounting plate 95 for the cylinder 20 is preferably so constructed to afford the proper angle of inclination, usually only a few degrees, of the cylinder center line CL from the normal to the center line of the bolster 14. Thus, when the annular flange 98 integrally formed at one end of the cylinder 20 is secured to pad 95, the cylinder 20 is cocked relative to the slack adjuster 55, whose center line CL1 is normal to the bolster center line.

The cylinder 20 is formed from a cylindrically shaped casting or housing 100, having an interior bore 101 in which slides a free floating piston 102. The piston 102 is a free floating piston in the sense that it is non-positively connected to the push rod 23 and in the sense that its skirt portion is of a smaller diameter than that of the bore 101 of the cylinder casting 100 so as to be guided within the bore 101 by two annular rings or bushings 102a and 102b. Preferably, the annular rings 102a and 102b are of a low friction material such as nylon. The annular ring 102a and 102b are rectangular in cross-section and the outer surfaces thereof extend outwardly of the outer peripheral surface of the piston 102 for engagement with the inner cylindrical surface of the cylinder 20. The peripheral skirt of the piston 102 need not be machined to high accuracy as the bushings 102a and 102b prevent the piston 102 from binding or hanging up on the cylinder wall when off center forces are exerted on the piston 102 by the piston rod 23. Moreover, the piston rings or bushings 102a and 102b also prevent hammering of the piston 102 on the cylinder wall because of vibrations or road bumps. The piston 102 is biased toward an end wall 104, FIG. 4, of the cylinder housing 100 by a biasing means in the form of a compression spring 105. The spring 105 is supported by an end coil 106 seated in an annular groove 108 in a non-pressure head 110 which is secured by a plurality of fasteners 111 to the cylinder housing 100. The non-pressure head 110 has an outer cylindrical sleeve wall 109 dimensioned to fit closely within the interior surface of the cylinder casting 100. The threaded fasteners 111 pass through the cylinder wall and into the sleeve wall 109 of the non-pressure head 110.

The non-pressure head 110 has a circular bore 112 therethrough with with a larger diameter portion in which is disposed an elongated bushing 114 for guiding the reciprocal movement of the push rod 23. The push rod 23 is guided at its forward end by a bushing 115 disposed in an aperture 116 formed in the bolster wall 91. The bushing 115 is held in its seat or aperture 116 by a retaining plate 117 secured by suitable fasteners 118, FIG. 1, to the front of the bolster at the wall 91. In this manner, the push rod 23 is guided by two widely spaced bushings 114 and 115. Preferably, the low friction bushings 114 and 115 are made of a nylon, Delrin plastic or other plastic material.

The non-pressure head 110 is so designated because it is not subjected to the fluid operating pressure for the piston 102, which fluid pressure is present at the end wall 104 of the cylinder casting 100. More specifically, air under pressure enters the cylinder casting 100 through port 121 and is directed against a continuous diaphragm 119 secured across the face 120 of the piston 102. The opposite piston face 122 of the piston 102 is at ambient pressure. The interior bore 101 of the cylinder housing 100 on the non-pressure side of the piston 102 is protected from dirt and other foreign matter as well as moisture; and particularly from air borne foreign matter by filters 125 in spaced bores 126 of the pressure head 110. As additional protection against foreign matter and particularly moisture, it is preferred practice that the bores 126 in the head 110 be in fluid communication with an opening 127 in the mounting plate 95 which, in turn, has an aligned opening 129 in the rear bolster wall 90. Thus, air moving into the cylinder bore 101 on the return side of the piston 102 is taken from inside the bolster 14 and moves through the openings 129 and 127 and the filters 125. Drain holes 131, FIG. 4, are provided in the plate 95 and bolster 90 near the bottom of the cylinder bore 101 to drain water accumulating in the cylinder housing 100.

Additionally, the bushing 114 and internal bore 101 of the cylinder housing 100 are protected against foreign matter moving along the piston rod 23 by means of a polyurethane wiper 130 disposed in an annular cavity 132 formed in the non-pressure head 110.

Figure 5:
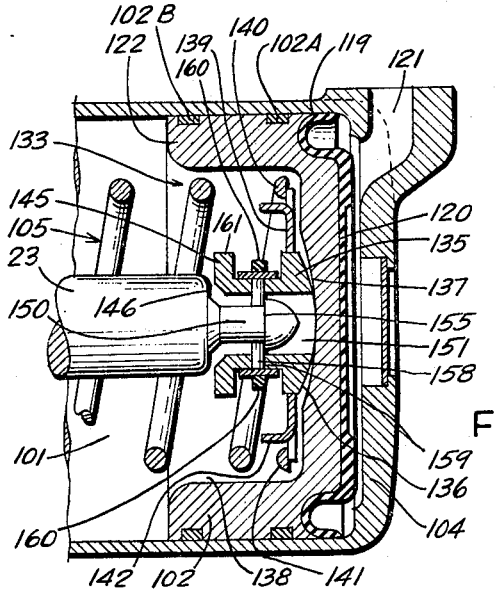
FIG. 5 is an enlarged and partial sectional view showing the relationship of the push rod and the piston.

The piston 102 is free floating within the cylinder housing 100 in that the piston 102 is non-positively connected to the push rod 23 by a unique connection means 133. The connection means 133, as best seen in FIG. 5 includes a connection element or head 135 having a convex outer surface 136 engaging a concave surface 137 formed within a cylindrical cavity 138 formed in the rear wall 122 of the piston 102. The connector element 135 has secured thereto an annular ring 139 which has an outer peripheral portion 140 which is under constant spring pressure from the outermost flattened surfaces of the outer coil 141 of the coil spring 105. The annular ring 139 has a number of inwardly struck fingers 142 just interior of the coils of the springs 105.

The connector element 135 has a rearward inwardly formed flange portion 145 which is adapted to engage a shouldered surface 146 at the large diameter end of the push rod 23 when the piston 102 is moved leftwardly, as viewed in FIGS. 4 and 5. Thus, it is to be understood that the thrust for moving the push rod 23 in its operating direction is transmitted from the piston 102 at the engaged surfaces 135 and 137 to the now engaged surfaces 145 and 146 on the connector element and piston rod 23, respectively.

As seen in FIG. 2, the push rod 23 is a considerably long rod as compared with the length of the cylindrical housing 100. Thus, from a standpoint of packaging and shipping to a location for assembly and securing to the bolster 14, it is preferred to have the push rod 23 detachable from the piston 102. The present invention allows the separate shipping and installation of the cylinder housing 100 by having a bullet nose or bayonet portion 150 formed on the end of the push rod 23 for insertion into a central bore 151 in the coupling element 135. The push rod 23 is prevented from moving leftwardly, as viewed in FIGS. 4 and 5, and from detachment from the connecting element 135 by means of engagement of a shouldered surface 155 on the bayonet portion 150 with the cylindrical portions of four spaced rivets 158 disposed in spaced radial holes 159 in the coupling element 135. A flexible band disposed in an outer circular groove on the coupling element 135 engages the flat heads of the four rivets 158 and holds them against radial outward movement.

The cylinder 20 can be readily disassembled merely by loosening the nuts 99 on the bolts 99b and cap screws 111 and thereafter pulling the cylinder casting 100 rightwardly, as viewed in FIG. 4, from bolster attached pad 95 and non-pressure head 110, which will remain on the piston rod 23. It will be recalled that the piston 102 freely floats within the bore 101 of the cylinder casting 100 and is neither attached to the piston rod 23 nor attached to the return spring 105. Thus, the removal of the cylinder 100 will carry with it the piston 102 with the convex surface 136 of the coupling element 135 being disengaged from the complementary shaped surface 137 of the piston 102. Thus, the cylinder casting 100 is readily removed to permit the servicing of its bore 101 or the piston bushings or packing 119 for the piston, as the case may be.

Manifestly, the bolster 14 may either have an integrally cast pad thereon similar to the pad 95; or a separable pad 95 may be secured to the bolster for receiving a cylinder casting 100. In either event it is preferred to have the cylinder casting 100 attached to such a pad and bolster in the manner described which eliminates the necessity for working inside the bolster 14 when removing or mounting the cylinder casting 100.

Also, as above described, the bullet shaped nose or cam portion of the piston rod 23 is readily insertable through the radial rivets 158 held by the flexible band 160. Thus, the assembly or disassembly of the piston rod sub-assembly and the cylinder casting 100 relative to one another and each to the bolster 14 is readily accomplished.

From the foregoing, it will be seen that the present invention affords a unique truck mounted brake unit adapted for ease of construction and assembly in the field on existing truck bolsters.

Hence, while preferred embodiments of the invention have been described and illustrated, it is to be understood that they are capable of variation and modification, and we therefore do not wish to be limited to the precise details set forth but desire to avail ourselves of such changes and alterations as fall within the purview of the following claims.

We claim:

1. In a brake mechanism mounted on a bolster of a truck of a railroad car wherein the bolster is resiliently supported for vertical movement relative to a truck frame; a pair of brake beams mounted on said truck frame and having brake shoes for movement against wheels for said truck; a live lever pivotally mounted on one of said brake beams; a dead lever pivotally mounted on the other of said brake beams; cylinder means mounted on said bolster; push rod means operable through said bolster; lever means operated by said push rod means and being in sliding contact with said live lever to pivot said live lever; said lever means movable in a vertical direction with said bolster to change its contact point with said live lever; slack adjuster means mounted on said bolster adjacent said cylinder means; the axes of said cylinder and slack adjuster means being inclined relative to one another; said slack adjuster means engageable with said dead lever; and sensing means extending from said slack adjuster through said bolster to said lever means to sense movement of said lever means.

2. In a brake unit mounted on a bolster of a truck for operating brake beams to engage brake shoes with the wheels of a railroad car; cylinder means secured to said bolster, rod means extending from said cylinder means and through openings in said bolster to the side of the bolster opposite the mounting of said cylinder means; bushing means on said bolster for guiding movement of said rod means for operating brake beams to move brake shoes into engagement with the wheels of said truck; lever means on said bolster for moving said brake beams to engage said brake shoes with said wheels; connecting means between said rod means and said lever means for transferring the movement of said rod means into pivotal movement of said lever means; and fulcrum means for said lever means secured to said bolster and positionable in at least two orientations to change the fulcrum point for said lever means.

3. In a brake unit mounted on a bolster of a truck for operating a live lever and a dead lever each on a brake beam to engage brake shoes with wheels of a railroad car, cylinder means secured to said bolster beneath the top level of said bolster, rod means extending from said cylinder means and through openings in said bolster to the side of the bolster opposite the mounting of said cylinder means, lever means on said bolster for actuating said live lever, pin and slot connecting means between said rod means and said lever means for transferring the reciprocal movement of said rod means into pivotal movement of said lever means, bracket means detachably secured to said bolster, an inclined portion on said bracket means for pivotally mounting said lever means, rotation of said bracket means and said inclined portion changing the position of the lever means relative to said live lever and said push rod means to change the amount of brake shoe load generated by said brake unit.

4. In a brake mechanism mounted on a bolster of a truck of a railroad car wherein the bolster is resiliently supported for vertical movement relative to a truck frame; a first brake beam mounted on said truck frame and having brake shoes for movement against car wheels on said truck, a live lever pivotally mounted on said first brake beam, a second brake beam mounted on said truck and carrying brake shoes for movement against other wheels on said truck, a dead lever pivotally mounted on said second brake beam, fulcrum means on said bolster, a lever mounted on said fulcrum means for pivotal movement and being disposed in a generally horizontal plane, said lever having an elongated slot therein, fluid operated cylinder means secured to said bolster and having a rod reciprocal by said fluid operating means, a pin disposed in said slot in said lever and secured to said rod of said fluid operating means, said pin engaging a portion of said lever in said slot and pivoting said lever about said fulcrum, said fluid cylinder means being mounted on said bolster and to reciprocate said rod and said pin along a substantially tangential line relative to the arcuate movement of said portion of the lever engaged by said pin thereby reducing the amount of sliding movement of said pin in said elongated slot during pivoting of said lever.

5. The brake mechanism of claim 4 wherein said fulcrum means includes a bracket with an inclined portion thereon and includes a pivot pin for connecting said lever to said inclined portions, said orientation of said inclined portions relative to said bolster changing the position of the pivot pin and changing the position of said rod pin in said elongated slot of said lever.

References Cited

UNITED STATES PATENTS

| 2,886,145 | 5/1959 | Vaught et al. | 188—200 |
| 3,266,601 | 8/1966 | Taylor | 188—52 |

DUANE A. REGER, *Primary Examiner.*